United States Patent Office 2,938,001
Patented May 24, 1960

2,938,001

CATALYST COMPOSITE

Armand J. de Rosset, Clarendon Hills, Ill., assignor, by mesne assignments, to Universal Oil Products Company, Des Plaines, Ill., a corporation of Delaware No Drawing. Filed Dec. 13, 1956, Ser. No. 628,001

6 Claims. (Cl. 252—432)

This invention relates to a catalyst composite and particularly to a peculiar association of hydrogenating catalyst with a boron phosphate carrier which results in a catalyst having exceptional resistance to deactivation when employed in coke-forming environments.

Catalysts having both cracking activity and hydrogenating activity are widely used for effecting many reactions. The cracking activity is usually due to an acid-acting carrying material of the porous, adsorptive, refractory oxide type while the hydrogenating activity is usually due to a heavy metal component, for example, metals or compounds of metals in groups V through VIII of the periodic table.

The most obvious use for a catalyst of this type is for hydrocracking wherein hydrocarbon or other large organic molecules are cracked to produce smaller molecules and the cracked fragments are saturated with hydrogen. A less obvious use is for reforming wherein a series of reactions including dehydrogenation of naphthenes, cracking of large molecules, isomerization of straight chain molecules, cyclization of straight chain molecules, and hydrogenation of unsaturated molecules are effected to produce stable high octane gasoline from inferior gasoline. Another reaction employing a catalyst of this type is a desulfurization reaction in which hydrocarbon fractions containing combined sulfur are subjected to mild hydrogenating conditions in the presence of a mildly acidic catalyst to effect the hydrogenation and desulfurization of molecules to produce hydrogen sulfide and the corresponding hydrocarbon. Catalysts of this type are also useful for effecting isomerization, alkylation, polymerization, dehydrogenation of paraffins or olefins, for example, to form butene or butadiene from normal butane.

The acid-acting component in the catalyst, or the cracking component as it is sometimes called, appears to provide mobility to various segments of a molecule so that large molecules under the proper conditions will crack while smaller molecules under different conditions will isomerize or dehydrogenate. The acid-acting member appears to impose strains on intermolecular bonds so that these bonds either weaken or break and the segments of the molecule are removed or rearranged. The hydrogenating component prevents instability of the product and provides for saturation of unstable double bonds and apparently co-acts in some way with the cracking component to yield a more satisfactory cracking activity than is obtained with the acid-acting component alone.

As hereinbefore stated, acid-acting components are usually adsorptive refractory inorganic oxides or combinations thereof or refractory materials in combination with other materials. Typical of these but not all inclusive are such materials as silica, alumina, zirconia, titania, boria, magnesia, etc., however, these employed alone generally do not have cracking activity. To obtain such activity, certain combinations such as silica-alumina, silica-zirconia, silica-titania, alumina-boria, etc. must be used and cracking activity may further be obtained by combining any of the refractory materials with acid-acting substances such as halogen including especially chlorine and fluorine.

As hereinbefore stated, the hydrogenating metals are generally referred to as the heavy metals and are usually in groups V through VIII of the periodic table. The best examples of hydrogenating metals are platinum, palladium, nickel, cobalt, iron, manganese, chromium, molybdenum, tungsten, vanadium, silver, gold, copper. Again, certain combinations of metals produce synergistic effects and some of the better known combinations include cobalt-molybdenum, nickel-tungsten, chromium-copper. The metals also may be used in the form of a compound and in fact, when in use generally are in some combined form such as the sulfide, oxide, halide, etc. Catalytic metals frequently are in the form of a lower oxide, that is, in a state of partial reduction.

In many of the uses, and these include especially reforming, desulfurization, hydrocracking and isomerization of heavy molecules or alkylation of unsaturated molecules, catalysts of this type are used in a coke-forming environment, that is, where the reactants employed and the conditions of the reaction are conducive to the formation of heavy, high molecular weight, black solid or semi-solid carbonaceous material which coats the catalyst covering its active surfaces and accordingly reduces its activity by shielding the catalytic material from the reactants. In some processes, the coke forms rapidly until an equilibrium coke content is on the catalyst, after which time there is little change in the coke content of the catalyst during the course of the reaction; while in other processes the build-up of coke is continuous until the catalyst must be removed from the reaction zone and regenerated by burning the coke from it in order to be of further use.

I have found that a peculiar relationship exists between hydrogenating components and one specific base which results in a catalyst having drastically diminished coke laydown when employed in a coke-forming environment. This catalyst is one in which the base contains boron phosphate. A catalyst employing a combination of a base containing boron phosphate and a hydrogenating component results in a catalyst which experiences a lesser coke lay-down and, therefore, may be used longer before regeneration or may be used at higher activity during the course of the reaction.

In one embodiment, this invention relates to a catalyst composite comprising boron phosphate and a hydrogenating metal component.

In another embodiment, this invention relates to a catalyst composite comprising a refractory adsorptive inorganic oxide, boron phosphate and a metal hydrogenating component.

In a specific embodiment, this invention relates to a catalyst composite comprising silica, alumina, boron phosphate and a hydrogenating metal component.

As will be hereinafter demonstrated, the presence of boron phosphate in a refractory oxide-hydrogenating metal catalyst produces a composite which has greater stability, results in a lesser coke lay-down and consequently provides a longer period of activity or alternatively a period of activity at a higher activity level for the catalyst. The combination of boron phosphate with a refractory oxide base has been observed to produce a composite with larger pores for a given surface area. Although it is not intended to limit the invention by this explanation, there is evidence to indicate that the pore-enlarging qualities of boron phosphate may be the reason for its coke-reducing effect. At any rate, it has been found that when a base material such as silica-alumina contains from about 5% to about 80% by weight of boron phosphate and this base is used to support a hydrogenating metal catalyst, the resultant catalyst may be used to promote reactions in a coke-forming environment with a remarkable diminishment in the amount of coke formation observed.

The effects herein described may be better illustrated in the following examples which are presented here for the purpose of illustrating rather than limiting the invention.

*Example I*

A catalyst was prepared by mixing 330 grams of 86.7% phosphoric acid, 180 grams of $H_3BO_3$ and 110 milliliters of water and evaporating the resultant solution to dryness. The dry mass was heated to 1300° F. for several hours and yielded 297 grams of boron phosphate. The boron phosphate was ground and mixed with 186 grams of alumina monohydrate and this mixture was combined with a binding agent and formed into 1/8" x 1/8" pills which in turn were calcined at 1240° F. for several hours.

The pills were impregnated with a solution containing sufficient cobalt and molybdenum to yield a composite, after further calcination, containing 7.7 grams of molybdenum trioxide and 2.64 grams of cobalt oxide per 100 grams of boron phosphate-alumina base.

This catalyst was used to process a sulfur-containing vacuum gas oil at 800° F., one liquid hourly space velocity, 1500 p.s.i. of hydrogen pressure and it caused 50% conversion of the gas oil to fuel oils and gasolines boiling below 650° F. At the completion of a run the catalyst was found to contain 2.7% coke by weight.

A catalyst was prepared in the same way having the same composition with regard to cobalt and molybdenum, however, the boron phosphate was omitted from the alumina base. In processing the same vacuum gas oil at the same conditions, it was found that the activity of the catalyst diminished rapidly and at the end of an equivalent run the boron phosphate-free catalyst contained 6.7% by weight of coke on the catalyst or almost 2½ times as much as was on the boron phosphate-containing catalyst.

*Example II*

A catalyst was prepared by forming a slurry of silica-alumina hydrogel and mixing with it aqueous solutions of boric acid and phosphoric acid and subsequently drying and calcining the slurry to form a composite of silica, alumina and boron phosphate. The resultant dried and calcined material was immersed in a solution containing soluble molybdenum ions and soluble cobalt ions which was subsequently evaporated to dryness and calcined. The composition and concentrations of the various ingredients were adjusted so that the ultimate composite contained 19.7% by weight of silica, 36.2% by weight of alumina, 31.4% by weight of boron phosphate, 9.7% by weight of molybdenum oxide and 3.0% by weight of cobalt oxide. This material was employed as a catalyst to hydrocrack a vacuum gas oil at 825° F. at a liquid hourly space velocity of one volume of gas oil per volume of catalyst per hour, at 1500 p.s.i. and employing hydrogen circulating at a rate of 6000 cubic feet per barrel of charge. Activity of the catalyst based on conversion to material boiling below 650° F. after the first day of operation was 62.9% and after 7 days of operation, the activity dropped to 54.7%. After 7 days of use, the amount of carbon on the catalyst amounted to 13.7% by weight.

An identical catalyst composition which was made using the same silica-alumina slurry but containing no boron phosphate and the same amount of cobalt and molybdenum was employed for purposes of comparison to convert the same charge stock at the same conditions. The silica-alumina-cobalt-molybdenum catalyst had an initial activity after 1 day on stream of 72.8% conversion but after 7 days its activity had dropped to 53.9%. After 7 days' use, this catalyst contained 17% by weight carbon. It is, therefore, apparent that the boron phosphate containing hydrogenating and cracking catalyst produced less carbon in use and furthermore, was a more stable catalyst which, although having a lower initial activity than the conventional catalyst, had a higher stable activity after a short period of use.

The boron phosphate component employed in this invention may be incorporated into the catalyst composite in any suitable manner. As in Example I, boron phosphate per se may be ground and commingled with ground cracking base and then the commingled powders pilled and calcined. As in Example II, the entire catalytic composite may be made simultaneously by mixing all components and causing their inter-reaction and precipitation together. Other methods by which boron phosphate may be incorporated into the composite is to soak solid boron phosphate in alumina or silica-alumina hydrosols or compounds such as aluminum nitrate and/or sodium meta-silicate, water-glass or ethylorthosilicate and dry the resultant mixture. Furthermore, hydrosols which are completely liquid may have boric acid and phosphoric acid added thereto so that the resultant hydrogel will contain boron phosphate, or at least components which will react to form boron phosphate, homogeneously dispersed throughout their structure.

I claim as my invention:

1. A catalyst comprising a refractory inorganic oxide base containing from about 5% to about 80% by weight of boron phosphate and a catalytic amount of a hydrogenating metal component, the metal of said hydrogenating component being a heavy metal in groups V to VIII of the periodic table.

2. The catalyst of claim 1 further characterized in that said oxide base comprises alumina.

3. The catalyst of claim 2 further characterized in that said hydrogenating component comprises platinum.

4. The catalyst of claim 1 further characterized in that said oxide base comprises alumina and silica.

5. A catalyst comprising a refractory inorganic oxide base containing from about 5% to about 80% by weight of boron phosphate and a catalytic amount of a hydrogenating metal component comprising molybdenum and cobalt oxides.

6. The catalyst of claim 5 further characterized in that said oxide base comprises alumina.

References Cited in the file of this patent

UNITED STATES PATENTS

| | | |
|---|---|---|
| 1,870,357 | Dierichs | Aug. 9, 1932 |
| 2,404,024 | Bailie | July 16, 1946 |
| 2,441,493 | Krug | May 11, 1948 |
| 2,480,672 | Plank | Aug. 30, 1949 |
| 2,525,145 | Mavity | Oct. 10, 1950 |
| 2,564,268 | Mathy et al. | Aug. 14, 1951 |